United States Patent
Suzuki

(10) Patent No.: US 11,787,534 B2
(45) Date of Patent: *Oct. 17, 2023

(54) DELIVERY ROTARY-WING AIRCRAFT

(71) Applicant: AERONEXT INC., Tokyo (JP)

(72) Inventor: Youichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,274

(22) Filed: Apr. 18, 2022

(65) Prior Publication Data

US 2022/0242558 A1    Aug. 4, 2022

Related U.S. Application Data

(62) Division of application No. 16/338,970, filed as application No. PCT/JP2016/079369 on Oct. 3, 2016, now Pat. No. 11,325,696.

(51) Int. Cl.
*B64C 27/52*    (2006.01)
*B64C 27/20*    (2023.01)
(Continued)

(52) U.S. Cl.
CPC .............. *B64C 27/52* (2013.01); *B64C 27/20* (2013.01); *B64C 27/54* (2013.01);
(Continued)

(58) Field of Classification Search
CPC ......... B64C 27/52; B64C 27/20; B64C 27/54; B64C 29/0033; B64C 39/02;
(Continued)

(56) References Cited

U.S. PATENT DOCUMENTS 5,195,702 A * 3/1993 Malvestuto, Jr. ....... B64C 19/00
244/206
6,260,796 B1 * 7/2001 Klingensmith ......... B64C 27/08
244/17.11
(Continued)

FOREIGN PATENT DOCUMENTS

CN    104819706 A    8/2015
EP    2902744        8/2015
(Continued)

OTHER PUBLICATIONS

First Notice of Examination Opinion dated Mar. 3, 2022 for related Chinese Patent Application No. 201680089632.7.
(Continued)

*Primary Examiner* — Medhat Badawi

(57) ABSTRACT

A delivery rotary-wing aircraft has a plurality of rotary wings, a central portion to which a plurality of arms for supporting the rotary wings are connected, a first mounting portion for loading a package, a second mounting portion which is located on the opposite side to the first mounting portion as viewed from the central portion, a first supporting member for coupling the first mounting portion with the central portion, and a connection portion between the central portion and the first supporting member. The center point of lift occurring in the rotary-wing aircraft with the rotation of the plurality of rotary wings and the center point of gravity of the rotary-wing aircraft coincide with the center point of the connection portion. The first supporting member is equipped with an adjustment mechanism for vertically downwardly extending the length of the first supporting member.

4 Claims, 8 Drawing Sheets

(51) Int. Cl.
*B64C 27/54* (2006.01)
*B64C 29/00* (2006.01)
*B64D 9/00* (2006.01)
*B64U 10/13* (2023.01)
*B64U 70/00* (2023.01)
*B64U 101/60* (2023.01)

(52) U.S. Cl.
CPC ............ *B64C 29/0033* (2013.01); *B64D 9/00* (2013.01); *B64U 10/13* (2023.01); *B64U 70/00* (2023.01); *B64U 2101/60* (2023.01); *B64U 2201/10* (2023.01)

(58) Field of Classification Search
CPC ....... B64C 39/024; B64C 27/08; B64C 13/20; B64D 9/00; B64D 1/02; B64D 45/00; B64U 10/13; B64U 70/00; B64U 2101/60; B64U 2201/10; B64U 2101/30; B64U 10/10; B64U 30/20; B64U 50/13
See application file for complete search history.

(56) References Cited

U.S. PATENT DOCUMENTS

| | | | | |
|---|---|---|---|---|
| 9,201,422 | B2* | 12/2015 | Ohtomo | G05D 1/0094 |
| 9,773,420 | B2* | 9/2017 | Ohtomo | G05D 1/0011 |
| 10,324,462 | B2* | 6/2019 | Jassowski | G08G 5/0008 |
| 10,370,100 | B2* | 8/2019 | Rothhaar | B64C 29/0033 |
| 10,724,860 | B2* | 7/2020 | Nishita | G01C 11/02 |
| 11,325,696 | B2* | 5/2022 | Suzuki | B64C 27/08 |
| 2011/0084162 | A1* | 4/2011 | Goossen | B64D 1/22 |
| | | | | 244/135 C |
| 2011/0226892 | A1* | 9/2011 | Crowther | B64C 1/30 |
| | | | | 244/17.23 |
| 2014/0034775 | A1* | 2/2014 | Hutson | B64C 27/10 |
| | | | | 244/17.23 |
| 2014/0046589 | A1* | 2/2014 | Metzler | G05D 1/0094 |
| | | | | 356/3.09 |
| 2014/0055613 | A1* | 2/2014 | Ohtomo | H04N 7/18 |
| | | | | 348/144 |
| 2014/0119716 | A1* | 5/2014 | Ohtomo | G01C 11/00 |
| | | | | 396/8 |
| 2014/0138477 | A1* | 5/2014 | Keennon | G05D 1/005 |
| | | | | 244/17.23 |
| 2014/0210663 | A1* | 7/2014 | Metzler | G01S 19/07 |
| | | | | 342/357.34 |
| 2014/0240498 | A1* | 8/2014 | Ohtomo | H04N 7/185 |
| | | | | 348/144 |
| 2014/0263823 | A1* | 9/2014 | Wang | B64C 27/08 |
| | | | | 244/17.23 |
| 2014/0336928 | A1* | 11/2014 | Scott | G01N 21/88 |
| | | | | 701/468 |
| 2014/0371952 | A1* | 12/2014 | Ohtomo | B64C 39/024 |
| | | | | 701/2 |
| 2015/0021429 | A1* | 1/2015 | Reichert | B64D 47/08 |
| | | | | 244/17.11 |
| 2015/0175276 | A1* | 6/2015 | Koster | B64F 1/00 |
| | | | | 244/114 R |
| 2015/0183528 | A1* | 7/2015 | Walsh | A01M 29/16 |
| | | | | 244/114 R |
| 2015/0220085 | A1* | 8/2015 | Ohtomo | G01S 19/13 |
| | | | | 701/2 |
| 2015/0232181 | A1* | 8/2015 | Oakley | B64C 39/024 |
| | | | | 244/17.23 |
| 2016/0049081 | A1* | 2/2016 | Ohtomo | G08G 5/0073 |
| | | | | 701/2 |
| 2017/0073065 | A1* | 3/2017 | Von Novak | H02K 7/1823 |
| 2018/0141647 | A1* | 5/2018 | Suzuki | B64D 47/08 |
| 2019/0373173 | A1* | 12/2019 | Wang | H04N 23/661 |
| 2020/0377207 | A1* | 12/2020 | Suzuki | B64C 27/52 |
| 2022/0242558 | A1* | 8/2022 | Suzuki | B64D 9/00 |

FOREIGN PATENT DOCUMENTS

| | | |
|---|---|---|
| EP | 3299282 | 3/2018 |
| JP | 2007101722 | 4/2007 |
| JP | 2013079034 A | 5/2013 |
| WO | WO2014080386 | 5/2014 |

OTHER PUBLICATIONS

Search Report dated Apr. 9, 2020 for European Patent Application No. 16918441.1.
Request for the Submission of an Opinion dated Jan. 18, 2023 for Korean Patent Application No. 10-2019-7012603.

* cited by examiner

[FIG. 1]
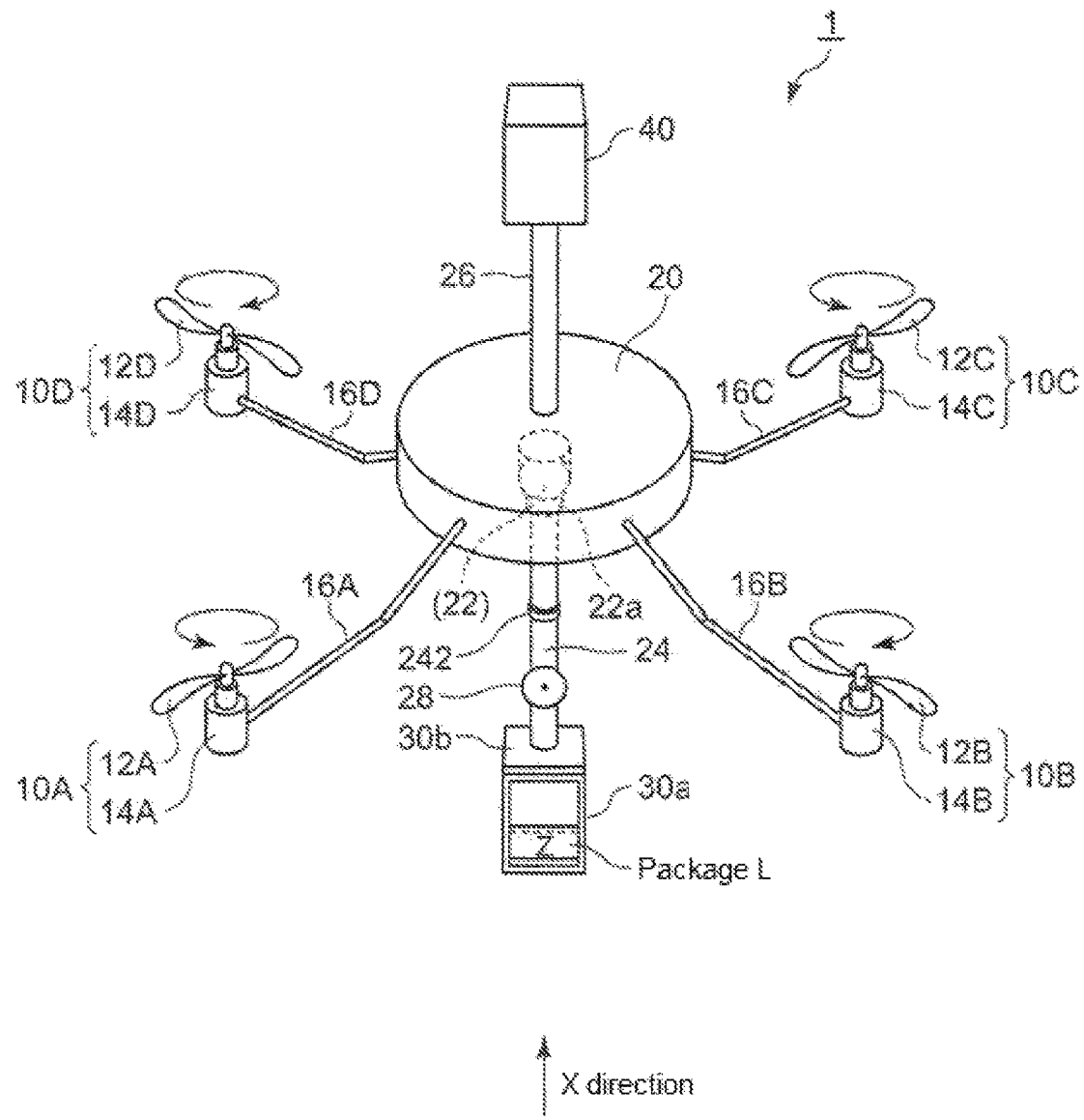
X direction

[FIG. 2]
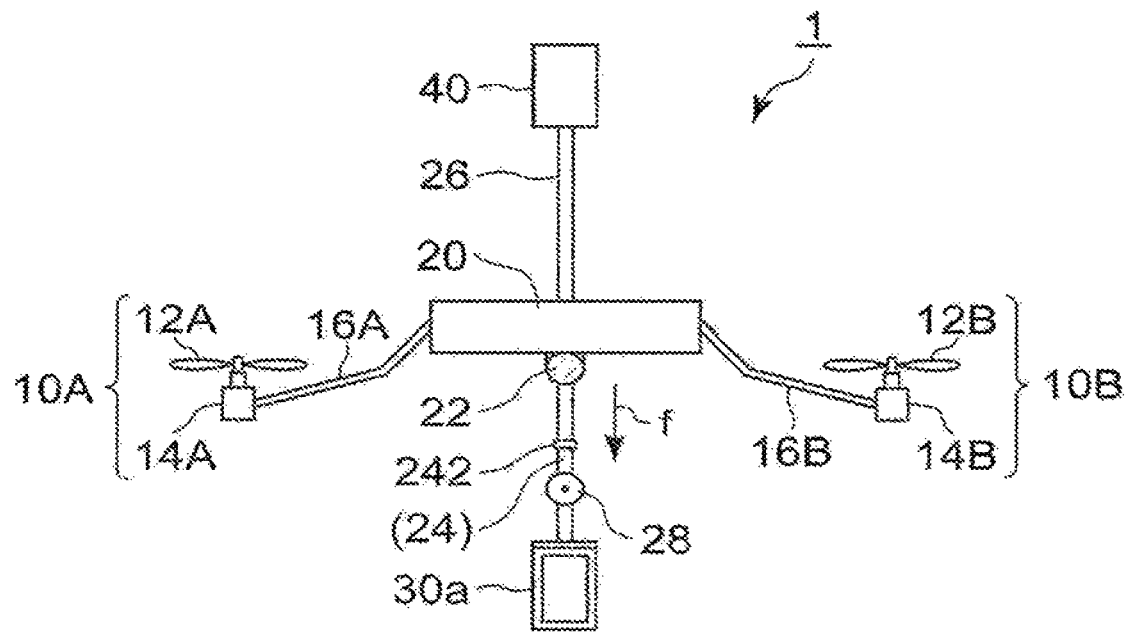
[FIG. 3]
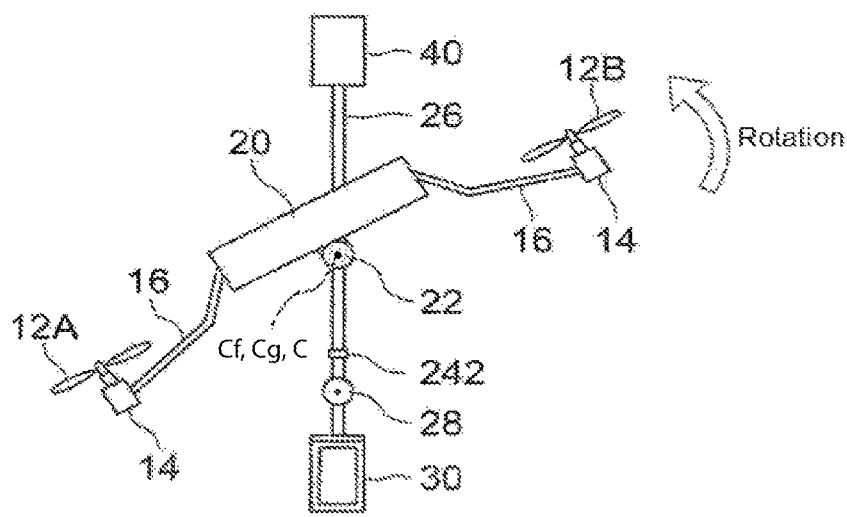
Movement of Rotary-Wing Aircraft

[FIG. 4]
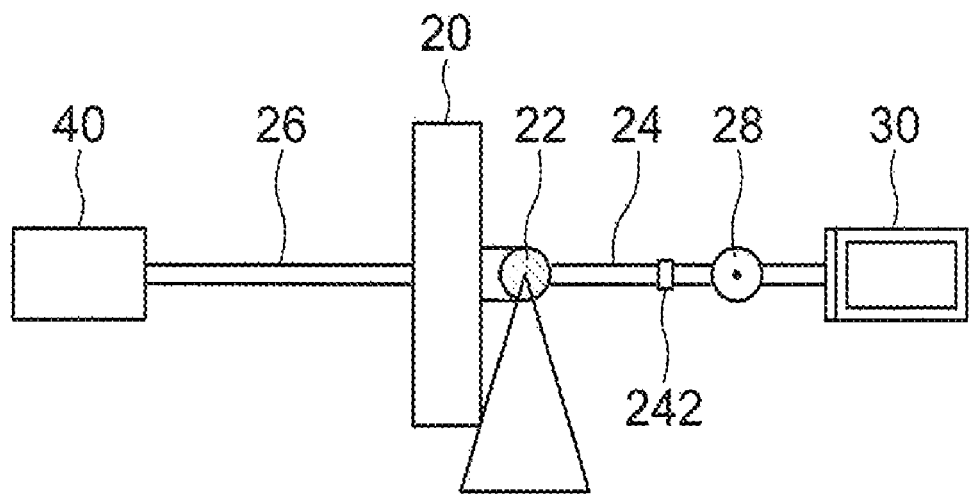

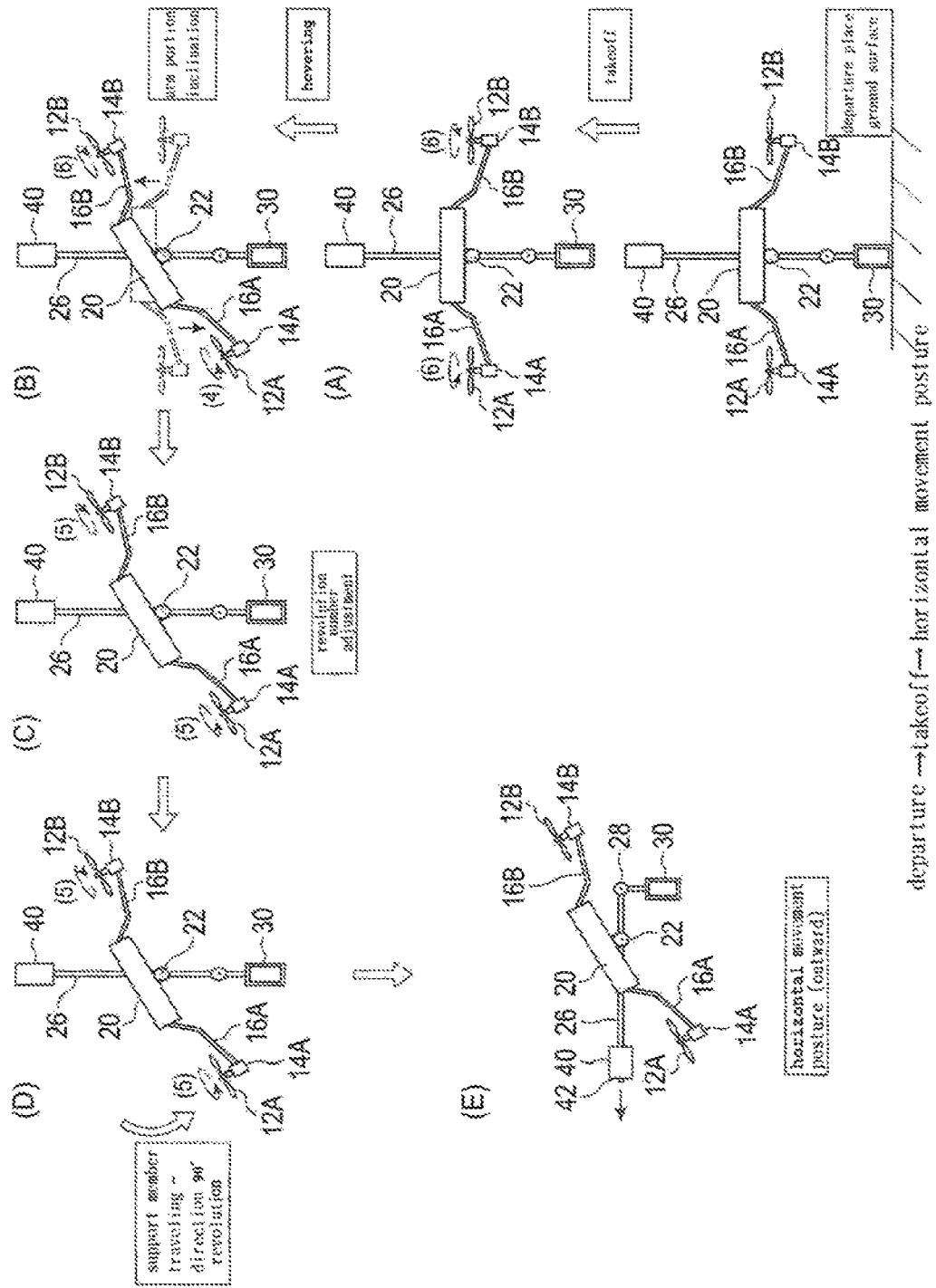
[FIG. 5]

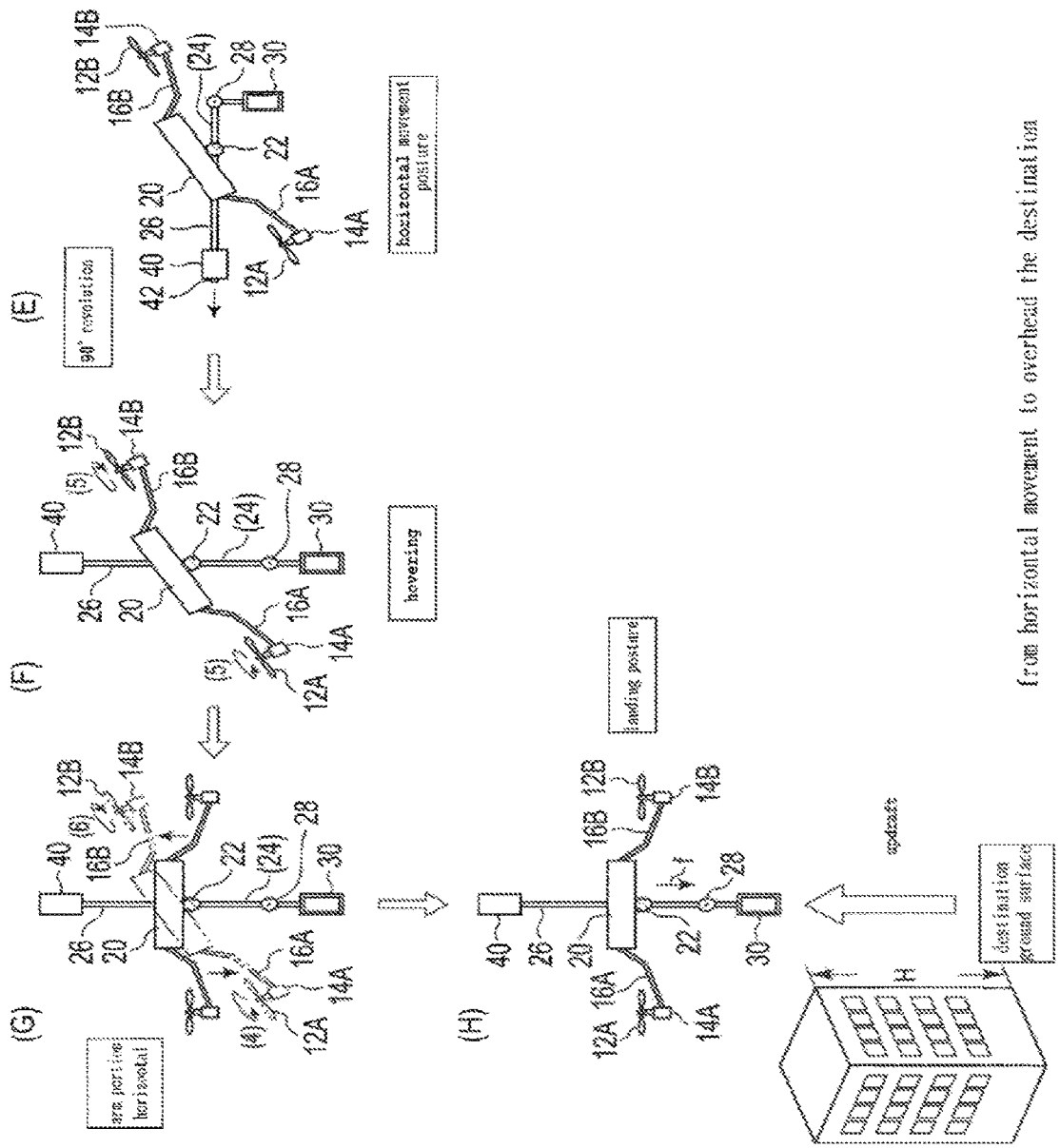

[FIG. 7]
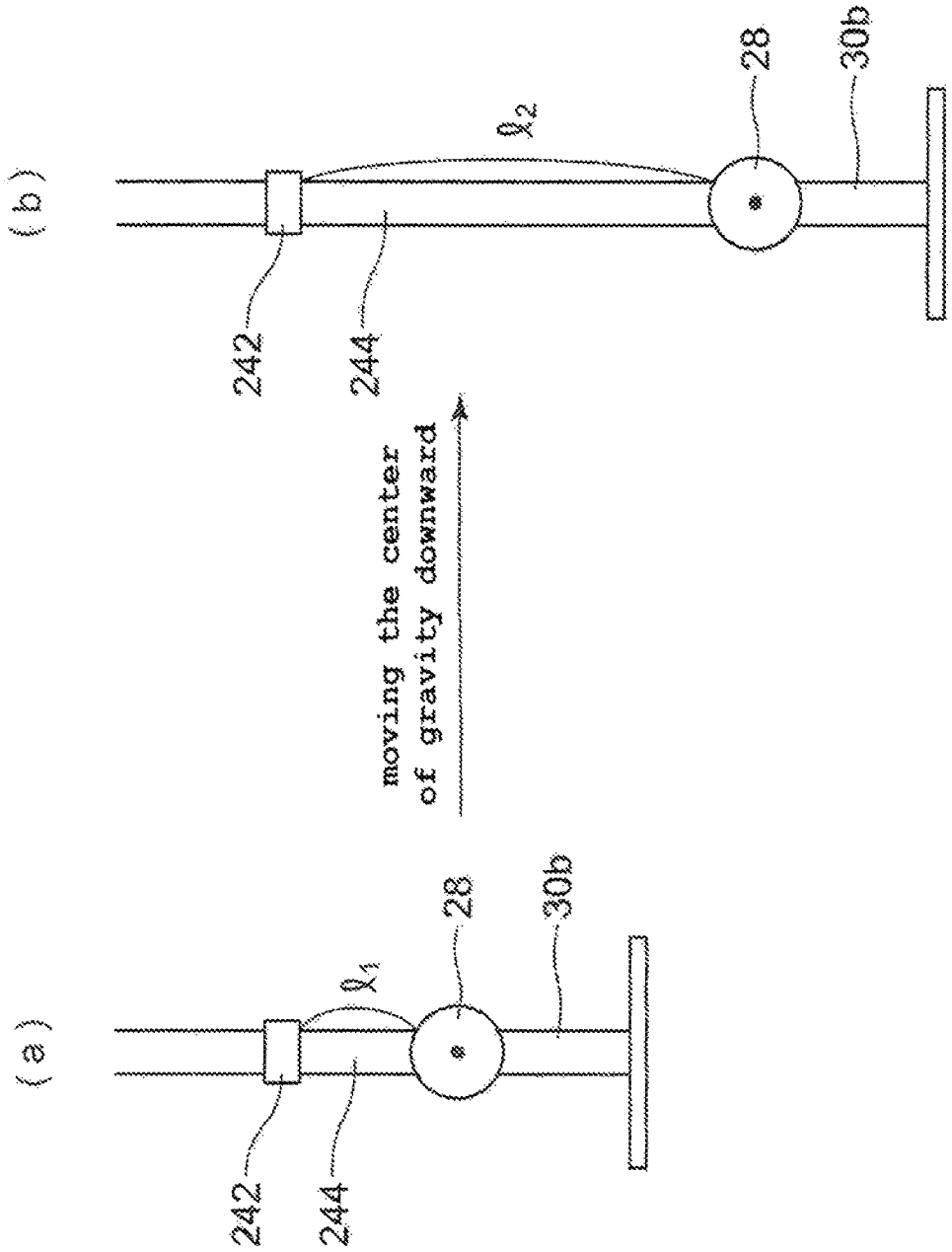

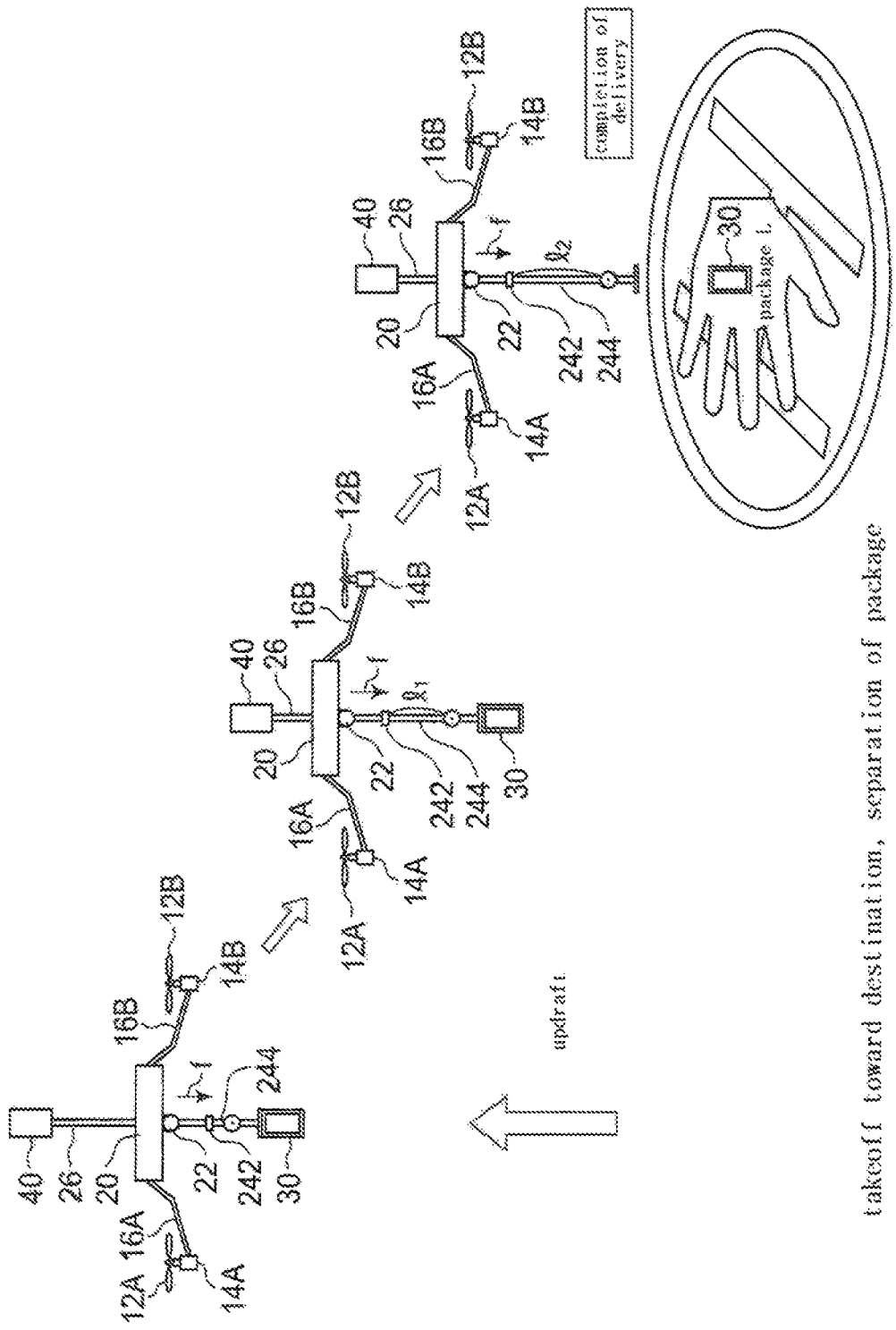

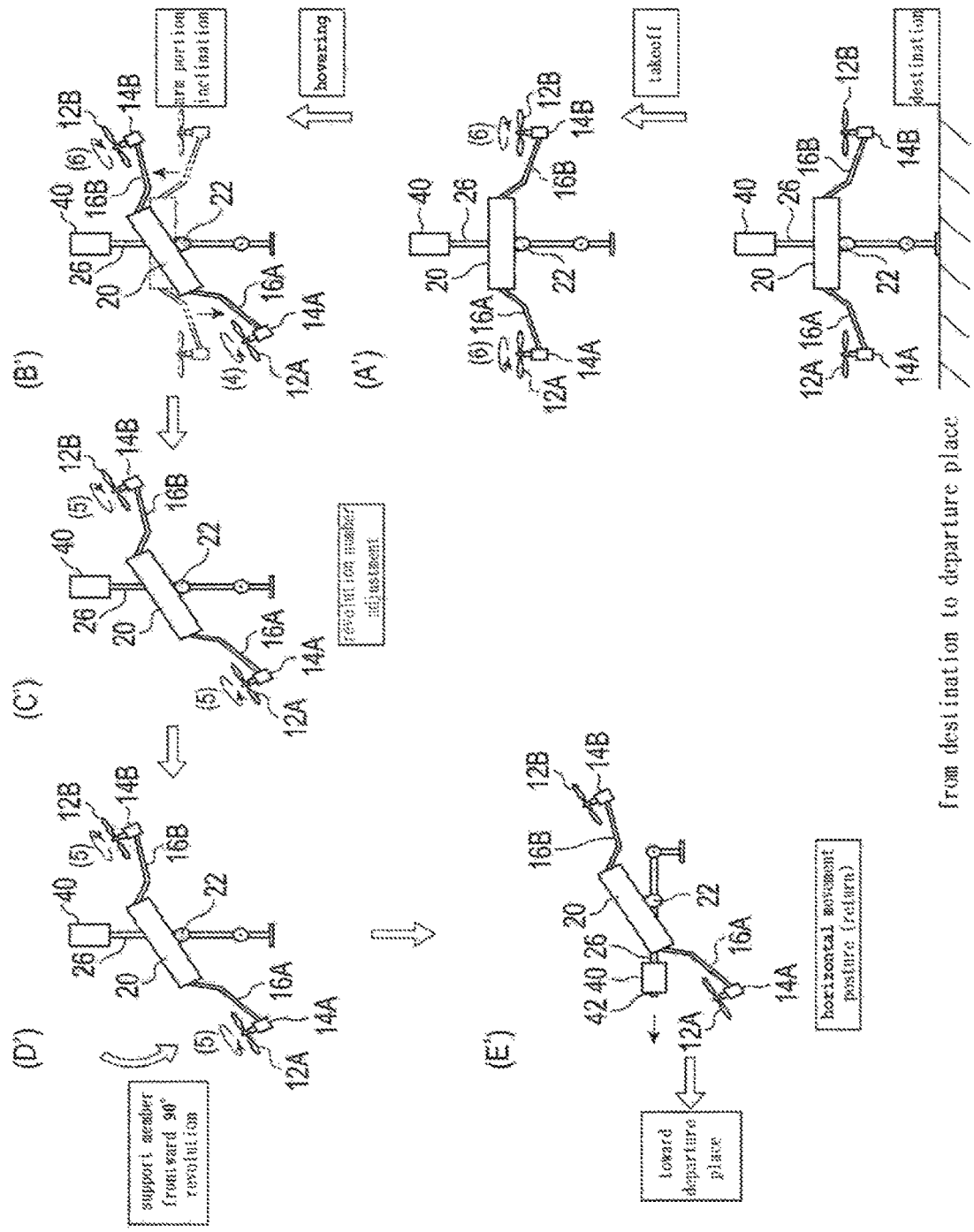

DELIVERY ROTARY-WING AIRCRAFT

CROSS-REFERENCE TO RELATED APPLICATIONS

This application is a division of U.S. patent application Ser. No. 16/338,970, filed Apr. 2, 2019, which is a U.S. National Stage of PCT/JP2016/079369, filed Oct. 3, 2016.

TECHNICAL FIELD

The present invention relates to a delivery rotary-wing aircraft, and more specifically, to a delivery rotary-wing aircraft capable of stably landing on a destination without being affected by an updraft occurring in high-rise buildings or the like.

BACKGROUND ART

A rotary-wing aircraft called a drone or multicopter is used in various fields such as security, agriculture, infrastructure monitoring and the like. By utilizing the rotary-wing aircraft, it is also possible to observe a phenomenon occurring at places where human beings cannot approach such as disaster sites and undeveloped regions, and to analyze the observed big data. Among the rotary-wing aircrafts, particularly, a small-sized and light-weight rotary-wing aircraft is suitably used mainly as a rotary-wing aircraft for aerial photography.

By using such a rotary-wing aircraft, it is possible to make "panoramic aerial photography" in which high-rise building construction sites such as a Lower apartment can be photographed at high resolution.

In recent years, small-sized and light-weight rotary-wing aircrafts have been studied as tools for delivering packages such as package delivery service. Patent Document 1 discloses a delivery system using a rotary-wing aircraft. (for example, Patent Document 1). The aforementioned delivery system forms inventory of items for delivering to a package delivery destination by an automated rotary-wing aircraft (drone). Further, the patent applicant hereby presents the following patent document as the invention described in a publication relating to the present invention.

CITATION LIST

Patent Document

Patent Document. 1: US Patent Application Publication No. 2015-0120094 A1

SUMMARY OF THE INVENTION

Technical Problem

However, the rotary-wing aircraft used in the delivery system described in Patent Document 1 is not configured as a rotary-wing aircraft capable of coping with an updraft occurring in high-rise buildings or the like. Rotary-wing aircraft, which is now referred to as a delivery rotary-wing aircraft, is a rotary-wing aircraft in which a general rotary-wing aircraft used for the rotary-wing aircraft for aerial photography is diverted as it is as a delivery rotary-wing aircraft. When a general rotary wing aircraft is diverted to a delivery rotary-wing aircraft, the following technical problems occur.

Typical rotary-wing aircrafts are inclined obliquely by wind. In the case of diverting a typical rotary-wing aircraft to a delivery rotary-wing aircraft, it is required to maintain the position of the package before and during the delivery as it is and to quickly deliver the package from a departure place to a destination. This is because, as the rotary-wing aircraft is inclined, the package delivered by the rotary-wing aircraft is also inevitably inclined.

Typical rotary-wing aircrafts tend to be easily inclined by wind. In addition, it is necessary to be inclined to travel forward. In the event that the package delivered by the rotary-wing aircraft is inclined at any moment, the commodity value of the package is lost. In particular, when the package delivered by the rotary-wing aircraft is a food containing home delivery pizza, home-delivery sushi, western confectionery and a liquid such as beverages, the business loss due to the inclination of the rotary-wing aircraft is significant. The same applies even if the rotary-wing aircraft is used to deliver daily necessities.

Further, at a timing just before a general rotary-wing aircraft lands on the destination, the rotary-wing aircraft may be inclined by an airflow occurring in high-rise buildings or the like. A typical rotary-wing aircraft inclined by an airflow first allows a leg on one side of the rotary-wing aircraft to make contact with the destination. After that, the rotary-wing aircraft has to contact a leg on the other side to the destination. It is not possible to maintain the inclination of the aircraft body properly counteracting the airflow after the leg on one side of the rotary-wing aircraft makes contact with the destination until the leg on the other side makes contact with the destination. As a result, there may be a case where the aircraft body flows along the blowing wind or the balance is lost and it is overturned. That is, due to the airflow occurring at the destination, the rotary-wing aircraft has a problem that it is turned over just before landing at the destination. In particular, when the gain is set to be high in order to cope with a payload loaded on a lower part by a general rotary-wing aircraft, the possibility of overturning is high.

In addition, the package delivered by a rotary-wing aircraft must be delivered from a delivery destination to a target destination within a few minutes to several tens of minutes depending on the goods according to the customer's request. If the goods are not delivered quickly, the commodity value will be lost.

However, the flying speed of a typical rotary-wing aircraft is not sufficient in terms of delivering goods quickly.

The rotary-wing aircraft has to deliver a package accurately from a delivery location to a target destination. The operator of the rotary-wing aircraft accurately needs to grasp the current position by means of a GPS device or the like on the way from the delivery location to the destination, and then to steer the rotary-wing aircraft. However, when the rotary-wing aircraft is inclined, the GPS antenna provided in the rotary-wing aircraft is also inclined. As a result, there is a problem that the GPS receiving sensitivity of the rotary-wing aircraft is lowered. Furthermore, there is a problem that immediately after delivery of a package from the rotary-wing aircraft, the aircraft loses its balance and overturns or falls.

It is therefore an object of the present invention to provide a delivery rotary-wing aircraft capable of solving various technical problems which may occur when a general rotary-wing aircraft is diverted for delivery, capable of stably landing on a destination, particularly without being affected by an updraft, and capable of stably continuing the flight even after delivering the package.

Technical Solution

The present inventors have conducted intensive studies, and have found that by controlling the center of gravity of the rotary-wing aircraft downward against an updraft, it is possible to stably land on a destination without being affected by the updraft, and further the balance is not lost even after separating the package from the rotary-wing aircraft, thereby completing the present invention. Specifically, the present invention comprises the following technical subject matters.

(1) A delivery rotary-wing aircraft including:
a plurality of rotary wings,
a central portion to which a plurality of arm portions for supporting the rotary wings are connected,
a first mounting portion for loading a package,
a second mounting portion which is located on the opposite side to the first mounting portion as viewed from the central portion,
a first supporting member for connecting the first mounting portion with the central portion, and
a connection portion between the central portion and the first supporting member,
characterized by being controlled in such a manner that the center point of lift occurring in the rotary-wing aircraft with the rotation of the plurality of rotary wings and the center point of gravity of the rotary-wing aircraft coincide with the center point of the connection portion, and
the first supporting member is equipped with an adjustment mechanism for vertically downwardly extending the length of the first supporting member.

(2) The delivery rotary-wing aircraft according to the item (1), characterized in that the first supporting member comprises an outer cylindrical supporting member and an inner cylindrical supporting member, the inner cylindrical supporting member is accommodated in the outer cylindrical supporting member, and the inner cylindrical supporting member slides downward to thereby vertically downwardly extend the length of the first supporting member.

(3) The delivery rotary-wing aircraft according to the items (1) or (2), characterized in that the second mounting portion has a control means which measures the acceleration at the time of landing of the rotary-wing aircraft or the numbers of rotations of the plurality of rotary wings, and changes the numbers of revolutions of the plurality of rotary wings against the vertically upward updraft applied to the rotary-wing aircraft.

(4) The delivery rotary-wing aircraft according to any one of the items (1) to (3), characterized in that the first supporting member has a joint portion between the connection portion and the first mounting portion.

(5) The delivery rotary-wing aircraft according to the item (4), characterized in that, when the rotary-wing aircraft moves in the horizontal direction, the first supporting member is horizontally positioned by bending the first supporting member in the traveling direction with the joint portion as a fulcrum.

Advantageous Effects

According to the present invention, there is provided a delivery rotary-wing aircraft capable of stably landing on a destination without being affected by an updraft. In addition, according to the present invention, in the case where the payload of the rotary-wing aircraft is increased by the package loaded on the rotary-wing aircraft, there is provided a delivery rotary-wing aircraft capable of stably flying without losing its balance even after the package is separated from the rotary-wing aircraft. Further, according to the present invention, there is provided a delivery rotary-wing aircraft which improves the maximum speed at the time of flight and thus improves fuel economy.

BRIEF DESCRIPTION OF DRAWINGS

FIG. 1 is a perspective view showing a configuration of a delivery rotary-wing aircraft according to one embodiment of the present invention.

FIG. 2 is a side view of a delivery rotary-wing aircraft.

FIG. 3 is a model diagram showing a mode in which an arm portion of the delivery rotary-wing aircraft is inclined.

FIG. 4 is a view showing the center point of gravity of the delivery rotary-wing aircraft.

FIG. 5 is a diagram showing a flight mode when the delivery rotary-wing aircraft takes off a departure place and completes the horizontal movement posture.

FIG. 6 is a diagram showing a flight mode when the delivery rotary-wing aircraft horizontally moves, arrives above the destination, and then enters the landing posture.

FIG. 7 is a view showing a state (a) before the first supporting member of the delivery rotary-wing aircraft is extended and a state (b) after the first supporting member is extended.

FIG. 8 is a diagram showing when the delivery rotary-wing aircraft lands on the destination and completes the delivery of the package.

FIG. 9 is a diagram showing a flight mode when a delivery rotary-wing aircraft from which the package is separated moves from a destination to a departure place.

DETAILED DESCRIPTION OF EMBODIMENTS

First Embodiment

<Delivery Rotary-Wing Aircraft>

FIG. 1 is a perspective view showing an outline of a delivery rotary-wing aircraft of the present invention. As shown in FIG. 1, the delivery rotary-wing aircraft 1 includes: a plurality of rotary wings 12, a central portion 20 to which a plurality of arm portions 16 for supporting the rotary wings 12 are connected, and a plurality of rotary wing portions 10 provided at the outer circumferential direction and at the end portions of the plurality of arm portions 16. A control device or the like is mounted on the central portion 20. Further, the delivery rotary-wing aircraft 1 includes a first mounting portion 30 for loading a package L on the lower portion of the central portion 20, and a second mounting portion 40 for loading a battery, a GPS antenna, and the like on the upper portion of the central portion 20.

The delivery rotary-wing aircraft 1 shown in FIG. 1 has four arm portions, but the number of the arm portions is not limited thereto. For example, the arm portions of the delivery rotary-wing aircraft 1 may be provided with six, eight, twelve or the like arm portions. In the case where the delivery rotary-wing aircraft 1 of the present invention stably flies and delivers a heavy package, the number of the arm portions is preferably six or more. In the first embodiment, a delivery rotary-wing aircraft 1 having four arm portions, which is the simplest rotary-wing aircraft, will be described.

The central portion 20 of the delivery rotary-wing aircraft 1 is located at the center in a circular ring formed by connecting the tip portions of the arm portions 16 when the delivery rotary-wing aircraft 1 is viewed from the right overhead. In the central portion 20, a planar shape constituted by a flat plate has a disk shape. Four arm portions 16A to 16D are extended toward the outer circumference of a circular ring formed by connecting the tip portion of the arm portion 16 from the side surface of the central portion 20. The four arm portions 16A to 16D are provided in four directions so as to be equally spaced in the circular ring. The four arm portions 16A to 16D are provided so that the interval between adjacent arm portions becomes 90°. In addition, the arm portion 16 may have a linear shape, or may have a bent shape based on a linear shape from a design standpoint.

The arm portions 16A to 16D are members supporting the corresponding rotary wing portions 10A to 10D, respectively. In order to stabilize the arm portions 16A to 16D, the outer periphery of a circular ring formed by connecting from the side face of the central portion 20 to the end portion of the arm portion 16 may be connected by using a propeller guard (not shown) such as a circular shaped member or the like. A coloring body such as an LED may be installed on the side surface of the circular shape in order to indicate the flying state of the rotary-wing aircraft.

Since the arm portions 16A to 16D have the same structure, the structure of the arm portion 16A will be mainly described. A rotary wing portion 10A is provided at the tip portion of the arm portion 16A which is in the outer peripheral direction as viewed from a central portion 20. The rotary wing portion 10A includes a rotary wing 12A and a power section 14A. The rotary wing 12A rotates in response to the output from the power section 14A. By rotating the rotor wing 12A, the delivery rotary-wing aircraft 1 generates a propelling force to take off a departure place, to move horizontally, and to land on the destination. Further, the rotary wing 12A can rotate rightward, stop, and rotate leftward.

The power section 14A is a drive device for rotating the rotary wing 12A. The power section 14A is not particularly limited as long as it is a means which can drive the rotary wing 12A. For example, an internal combustion engine, an electric motor, or the like may be used. The power sections 14A to 14D correspond to the rotary wings 12A to 12D, respectively.

As shown in FIG. 1, the rotary wing 12A is diagonally opposed to the rotary wing 12C and rotates in the same rotation direction. The rotary wing 12B is diagonally opposed to the rotary wing 12D and rotates in the same rotation direction. The rotational direction of the rotary wing 12A is different from that of the rotary wing 12B. For example, the power section 14A that drives the rotary wing 12A may be an electric motor for right rotation, and the power section 14B that drives the rotary wing 12B may be an electric motor for left rotation.

The delivery rotary-wing aircraft 1 has a first mounting portion 30. The first mounting portion 30 is located at a lower position as viewed from the central portion 20. The first mounting portion 30 can load a package L. The first mounting portion 30 always maintain its shape vertically downward so that the position of the loaded package L and the state of the package L can be maintained. The first mounting portion 30 is not particularly limited as long as it can store the package L. The package L loaded in the first mounting portion 30 is an undesirable package if it is inclined or if the loaded position is changed. Therefore, the first mounting portion 30 must always maintain a stable position.

Further, the first mounting portion 30 may have a support motor (not shown). The state of the package L loaded on the first mounting portion 30 can be more stably maintained by providing the support motor.

The first mounting portion 30 may include a removable storage box 30a and a mounting portion 30b for mounting the storage box 30a. In case where the storage box 30a can be transferred at the delivery place, after the delivery of the package L is completed, the storage box 30a may be removed from the mounting portion 30b of the first mounting portion 30, so that the first mounting portion 30 may be only the mounting portion 30b. Further, in place of the storage box 30a, a simple package holding means (not shown) such as a net may be employed.

The storage box 30a may employ a structure capable of heat retention or heat insulation in order to maintain the temperature inside the box. The storage box 30a may have a lid for the storage box on the side of the box. For example, the lid for the storage box may be a lid of a type that can be slidably fitted into a groove (not shown) provided in the storage box 30a.

The delivery rotary-wing aircraft 1 has a second mounting portion 40. The second mounting portion 40 is located on the upper side which is the opposite side as viewed from the central portion 20. The second mounting portion 40 mainly includes members and devices necessary for driving and controlling the delivery rotary-wing aircraft 1. Examples of necessary members and devices include a drive battery, a receiver for receiving a signal from a transmitter operated by an operator, a control device, an infrared sensor, a GPS antenna for receiving positioning signals, and the like.

The control device includes a sensor for measuring the position and direction of the rotary-wing aircraft, a sensor for measuring the speed and acceleration of the rotary-wing aircraft, a measuring device for measuring the rotational direction and the number of rotations of the rotary wing, a measuring device for measuring the weight of the rotary-wing aircraft, a load (payload) at the time of loading a package, a central processing unit (CPU), and the like.

The delivery rotary-wing aircraft 1 is provided with a first mounting portion 30 on the lower side and a second mounting portion 40 on the upper side, around the central portion 20. The central portion 20 and the first mounting portion 30 are connected via a first supporting member 24. The central portion 20 and the second mounting portion 40 are connected via a second supporting member 26. A connecting portion 22 is provided just below the central portion 20 so as to come into contact with the lower surface of the central portion 20. The connecting portion 22 is provided between the lower surface of the central portion 20 and the first supporting member 24.

For example, the connecting portion 22 may be a hollow member having a biaxial gimbal structure. Further, the connecting portion 22 may be a member such as a ball joint that comprises a ball stud with a round bar attached to a metal ball and a socket 22a in spherical contact with the ball stud. Since the connecting portion 22 has a biaxial gimbal structure, it swings in an arbitrary direction. The connecting portion 22 swings in an arbitrary direction along the spherical surface. As the connecting portion 22 swings in an arbitrary direction, the central portion 20 is arbitrarily swung. The plane formed by the arm portions 16A to 16D attached to the central portion 20 is inclined at a constant angle.

FIG. 2 is a side view of a delivery rotary-wing aircraft 1. FIG. 2 is a side view of the delivery rotary-wing aircraft 1 shown in FIG. 1 as viewed from the X direction. FIG. 3 is a model diagram showing a shape in which an arm portion 16 of the delivery rotary-wing aircraft 1 shown in FIG. 2 is inclined.

FIG. 3 is a model diagram showing a mode in which the plane formed by the arm portions 16A to 16D is inclined. In the delivery rotary-wing aircraft 1, the connecting portion 22 can make the plane formed by the arm portions 16A to 16D inclined. In the delivery rotary-wing aircraft 1 shown in FIG. 3, the arm portion 16A can be positioned downward and the arm portion 16B can be positioned upward by making the connection portion 22 inclined leftward. Further, when the connecting portion 22 of the delivery rotary-wing aircraft 1 is inclined leftward, the numbers of rotations of the rotary wings 12A and 12D may be set to be smaller than the numbers of rotations of the rotary wings 12B and 12C.

The delivery rotary-wing aircraft 1 is controlled such that the center point Cf of lift occurring by the rotation of the plurality of rotary wings and the center point Cg of gravity of the rotary-wing aircraft coincides with the center point C of the connection portion 22. The connection portion 22 has a center point C. The center point C of the connection portion 22 is the center point Cg of the gravity of the delivery rotary-wing aircraft 1 when the package is loaded. FIG. 4 is a model diagram showing the center point Cg of gravity of the delivery rotary-wing aircraft 1.

As shown in FIG. 4, the center point Cg is set on a supporting member formed by the first supporting member 24 and the second supporting member 26. In FIG. 4, the center point Cg is determined in consideration of the balance of the weight generated by a first mounting portion 30 present on the right side, a package L loaded on the first mounting portion 30, a first supporting member 24 and the like, and the weight generated by a second mounting portion 40 present on the left side, a member mounted on the second mounting portion 40, a second support member 26 and the like. Further, FIG. 4 is a model diagram showing the balance of a seesaw.

In consideration of the balance of the weight, the support point on the supporting member composed of the first supporting member 24 and the second supporting member 26 becomes the center point Cg. The center point Cg measures the weight on the right and left sides by a weight sensor mounted on the second mounting portion 40, and determines a support point by a central processing unit (CPU) mounted on the second mounting portion 40, and the support point is defined as the center point Cg.

At the same time, the center point C of the connecting portion 22 is also the center point Cf of the lift generated in the delivery rotary-wing aircraft 1 by the rotation of the rotary wings 12A to 12D. The center point Cf is determined by a central processing unit (CPU) mounted on the second mounting portion 40 by measuring the number of revolutions of the rotary wings, the rotating direction and the like by means of a rotary wing measuring sensor mounted on the second mounting section 40.

The delivery rotary-wing aircraft 1 controls the center point C of the connection portion 22 such that the center point Cg of gravity and the center point Cf of lift coincide with each other. That is, the delivery rotary-wing aircraft 1 makes the center point Cg of gravity and the center point Cf of lift coincide with the center point C. Therefore, a rotation motion due to gravity caused by the first supporting member 24, the first mounting portion 30, the package L loaded on the first mounting portion 30 or the like does not occur around the center point Cf of the lift. The delivery rotary-wing aircraft 1 focuses on the gravity and lift applied to the rotary-wing aircraft and suppresses the rotation moment caused by the gravity so that the numbers of rotations of the rotary wings 12A to 12D can be maintained at the same number of revolutions.

As a first technical feature, the delivery rotary-wing aircraft 1 can counteract the vertically upward updraft that is applied to the rotary-wing aircraft. That is, even if the delivery rotary-wing aircraft 1 receives an updraft by high-rise buildings or the like after arriving above the destination, it can stably land on the destination without making the rotary-wing aircraft itself unstable.

After arriving above the destination, the delivery rotary-wing aircraft 1 allows the center of gravity of the rotary-wing aircraft to move downward so as to counteract the updraft caused by a high-rise building or the like. It is possible to oppose to an updraft by moving the center of gravity of the delivery rotary-wing aircraft 1 downward. In order to move the center of gravity of the delivery rotary-wing aircraft 1 downward, the length of the first supporting member 24 is changed so as to extend the first supporting member 24 in the downward direction. The length of the first supporting member 24 is extended by an adjustment mechanism 242 provided in the delivery rotary-wing aircraft 1. In addition, the distance between the second supporting member 26 and the central portion 20 is set to be short by moving the second mounting portion 40 in the direction of the central portion 20.

The adjustment mechanism 242 is not particularly limited as long as it has a structure capable of changing the length of the first supporting member 24. For example, the adjustment mechanism 242 may have a cylindrical structure having stretchability. The first supporting member 24 is composed of a first supporting member 24a and a first supporting member 24b. The first supporting member 24a is an outer cylindrical part and the first supporting member 24b is an inner cylindrical part to accommodate the first supporting member 24b in the first supporting member 24a. The first supporting member 24b can slide downward with respect to the first supporting member 24a, and is fixed at a predetermined position inside the first supporting member 24a.

As the adjustment mechanism 242, the following structure may be adopted. In order to slide the first supporting member 24b downward with respect to the first supporting member 24a, the first supporting member 24b may be pin-fixed by a pin passing through the inner wall from the outer side wall of the first supporting member 24a toward the inner wall of the first supporting member 24b.

When the first supporting member 24b is slid downward to extend the first supporting member 24, the first supporting member 24b pin-fixed in the first supporting member 24a can be slid downward by pulling out the pin. As a result, the length of the first supporting member 24 can be extended. As a result, the center of gravity of the delivery rotary-wing aircraft 1 can be moved downward. Further, the adjustment means 242 comprises two supporting members composed of an outer cylinder and an inner cylinder, but may be further provided with an inner cylinder inside the inner cylinder so as to be composed of three or more supporting members.

The length of the first supporting member 24 after extension can be appropriately set. The length of the first supporting member 24 after extension is determined in consideration of the weight of the rotary-wing aircraft 1, the package (payload) loaded on the first mounting portion 30, and the like. For example, when a rotary-wing aircraft that is loading a predetermined package (payload) is subjected to an updraft, the length of the first supporting member 24 after extension which is necessary for performing the movement of the center of gravity in the downward direction is set.

The first supporting member 24 is appropriately selected in consideration of the weight of the delivery rotary-wing aircraft 1, the package (payload) loaded on the first mounting portion 30, and the like. It is possible to set the length of the extended first supporting member 24 and its structure which are required when the delivery rotary-wing aircraft 1 receives the updraft.

In addition, as the adjustment mechanism 242, for example, a rack-and-pinion, a steering gear mechanism used for focusing in an optical apparatus or the like may be adopted.

The delivery rotary-wing aircraft 1 may change the number of rotations of the rotary wing in addition to moving the center of gravity of the rotary-wing aircraft downward. Here, "changing the number of rotations" includes decreasing the number of rotations of the rotary wings rotating in a certain direction, stopping the rotation of the rotary wing, and reversing the direction of rotation. By changing the number of revolutions of the rotary wings in this way, the gravity of the delivery rotary-wing aircraft 1 can be generated to oppose to the updraft.

As a second technical feature, the delivery rotary-wing aircraft 1 does not lose its balance even after the package is separated from the rotary-wing aircraft. As a result, the delivery rotary-wing aircraft 1 does not overturn or fall. This is because the delivery rotary-wing aircraft 1 has already moved the center of gravity of the rotary-wing aircraft downward before separating the package from the rotary-wing aircraft.

When a typical rotary-wing aircraft is loaded with the package, the center of gravity of the rotary-wing aircraft is moved greatly upward by separating the package from the rotary-wing aircraft. As a result, the typical rotary-wing aircraft greatly breaks its balance, which will overturn and fall.

However, in the delivery rotary-wing aircraft 1 of the present invention, even when the center of gravity of the rotary-wing aircraft is moved upward by separating the package from the rotary-wing aircraft 1, the length of the first supporting member 24 is already extended downward, and thus, the center of gravity of the rotary-wing aircraft does not move. In the delivery rotary-wing aircraft 1, the movement of the center of gravity in the upward direction caused by the separation of the package from the rotary-wing aircraft 1 is canceled by the movement of the center of gravity in the downward direction.

That is, by extending the first supporting member 24 in the downward direction, the rotary-wing aircraft 1 of the present invention can not only move its center of gravity downward against the updraft, but also the movement of the center of gravity upward can be canceled immediately after the package is separated from the rotary-wing aircraft.

The first supporting member 24 of the delivery rotary-wing aircraft 1 includes a joint portion 28 which is provided on the first supporting member 24 and positioned between the upper portion of the mounting portion 30b of the first mounting portion 30 and the lower portion of the first supporting member 24. The joint portion 28 can be rotated so that the first supporting member 24 is bent in the traveling direction of the delivery rotary-wing aircraft 1, with the joint portion 28 as a fulcrum. The angle at which the joint portion 28 is bent is not particularly limited. It can be set appropriately according to the conditions under which the delivery rotary-wing aircraft 1 is flying. For example, even if the first supporting member 24 is bent at 90° in the traveling direction, the first mounting portion 30 is always suspended vertically downward. The package L loaded on the first mounting portion 30 is delivered up to the destination while maintaining the position and condition at the departure place.

The joint portion 28 is driven by a signal from a control device mounted on the central portion 20. The joint portion 28 receives a signal from the control device and bends the first supporting member 24 with the joint portion 28 as a fulcrum by a drive motor (not shown) provided in the joint portion 28. In addition, the joint portion 28 has a lock mechanism. The first supporting member 24 holds the angle (for example, 90°) appropriately set according to the conditions under which the delivery rotary-wing aircraft 1 is flying, and is fixed by the lock mechanism at the bent position.

Further, the joint portion 28 is fixed, for example, by a lock mechanism at a position where the first supporting member 24 is bent at 90° in the traveling direction, rotates at 90° in the direction opposite to the traveling direction, so that it can return to the initial state. When the joint portion 28 returns to the initial state, the first supporting member 24 becomes a vertically upward direction, and the first supporting member 24 and the second supporting member 26 are arranged in a straight line.

<Flight Mode of Delivery Rotary-Wing Aircraft>

Hereinafter, the flight mode of the delivery rotary-wing aircraft 1 of the present invention will be described. In the following description, the flight mode of the delivery rotary-wing aircraft 1 is explained by dividing it into two routes: route A "from a departure place to a destination" and route B "from a destination to a departure place".

(Route A "from a Departure Place to a Destination")

Route A is a flight route when the delivery rotary-wing aircraft 1 loaded with a package L takes off a departure place and lands on the destination, and the package L is unloaded from the delivery rotary-wing aircraft 1 loaded with the package L at the destination, to thereby complete the delivery (package delivery service) of the package L. The flight route and posture of the delivery rotary-wing aircraft 1 are measured all the time by a GPS antenna and an infrared sensor provided in the second mounting section 40.

FIG. 5 is a diagram showing a flight mode when the delivery rotary-wing aircraft 1 takes off from a departure place, stops in the air (hovering) and completes the horizontal movement posture. At the departure place, the package L to be delivered to a destination is loaded on the first mounting portion 30 of the delivery rotary-wing aircraft 1. The package L is stored in the storage box 30a which is the first mounting portion 30. The package L is fixed so as not to move within the storage box 30a. After the package L is stored in the storage box 30a which is the first mounting portion 30, the lid closing may be performed by a lid from the side surface of the storage box 30a so that the package L does not come into contact with an external air.

The operator operates a radio control transmitter having the operating unit and raises the output of the power sections 14A to 14D of the rotary wing portions 10A to 10D to increase the numbers of rotations of the rotary wings 12A to 12D. Due to the rotation of the rotary wings 12A to 12D, the lift necessary to float the delivery rotary-wing aircraft 1 occurs vertically upward. When the lift exceeds the gravity acting on the delivery rotary-wing aircraft 1, the delivery rotary-wing aircraft 1 leaves the ground and takes off a departure place.

(A) Aerial Stopping (Hovering)

The delivery rotary-wing aircraft 1 ascends by increasing the rotation speed of the rotary wings 12A to 12D. Thereafter, the delivery rotary-wing aircraft 1 continues to ascend and reaches a certain altitude. The delivery rotary-wing aircraft 1 that reaches a certain altitude performs an aerial stopping (hovering) at the altitude. The altitude is appropriately determined by the flight route of the delivery rotary-wing aircraft 1, the height of buildings such as high-rise buildings, the aerial law applied to the delivery rotary-wing aircraft 1, and the like. The operator may preset the altitude at which the delivery rotary-wing aircraft 1 performs an aerial stopping (hovering) in consideration of various conditions.

Since the weight applied to the delivery rotary-wing aircraft 1, and the lift generated in the delivery rotary-wing aircraft 1 by the rotation of the rotary wings 12A to 12D are dynamically balanced, the rotary-wing aircraft can be stopped in the air (hovering). The numbers of rotations of the rotary wings 12A to 12D are maintained at a constant level. Aerial stopping (hovering) is performed in order for the delivery rotary-wing aircraft 1 to start preparation for horizontal movement posture. Further, in FIG. 5, it is assumed that when the delivery rotary-wing aircraft 1 is subjected to rotation-aerial stopping (hovering), the numbers of revolutions of the rotary wings 12A to 12D are level (6) among 10 stages (levels (1) to (10)).

(B) Inclination of Arm Portion

The arm portion 16 of the delivery rotary-wing aircraft 1 which is subjected to aerial stopping (hovering) is kept horizontal and is not inclined with respect to the horizontal direction. Thereafter, the arm portion 16 is inclined forwardly downward so that the rotary wings 12A and 12D, which are front rotary wings, are lower than the rotary wings 12B and 12C which are rear rotary wings with respect to the traveling direction of the delivery rotary-wing aircraft 1. When the arm portion 16 inclines forwardly and downwardly, the numbers of rotations of the front rotary wings 12A and 12D are made smaller than the numbers of rotations of the rear rotary wings 12B and 12C, and the numbers of rotations of the rear rotary wings 12B and 12C are increased. Further, in FIG. 5, when the delivery rotary-wing aircraft 1 inclines the arm portion 16, the numbers of revolutions of the rotary wings 12A and 12D on the front side are set to level (4), and the numbers of rotations of the rotary wings 12B and 12C on the rear side is set to level (6).

(C) Adjustment of the Numbers of Rotations of Rotary-Wings

Next, the delivery rotary-wing aircraft 1 adjusts the numbers of rotations of the rotary wings 12A to 12D after inclining the arm portion 16 while hovering (aerial stopping). Even in the case where the arm portion 16 is inclined, the delivery rotary-wing aircraft 1 can make the numbers of rotations of all the rotary wings 12A to 12D equal.

This is because the delivery rotary-wing aircraft 1 of the present invention is designed so that the point of action of gravity of the rotary-wing aircraft 1 is a connecting portion 22, and the connecting portion 22 is the center point of the lift of the delivery rotary-wing aircraft 1. That is, the center point of gravity of the delivery rotary-wing aircraft 1 physically completely coincides with the center point of the connecting section 22, which is a center point of lift of the delivery rotary-wing aircraft 1. Further, in FIG. 5, after the delivery rotary-wing aircraft 1 adjusts the numbers of rotations of the rotary wings, the numbers of rotations of the rotary wings 12A to 12D are set to level (5).

(D) Transition to Horizontal Movement Posture

Next, the delivery rotary-wing aircraft 1 rotates the second supporting member 26 and the first supporting member 24 to the left at 90° so that the second mounting part 40 is the most distal part with the joint part 28 as a fulcrum. The joint portion 28 is stopped at a position where the second mounting portion 40 is rotated to the left, for example, at 90°, and is fixed by a lock mechanism or the like at the position. The delivery rotary-wing aircraft 1 always keep the direction of the first mounting portion 30 vertically downward only by rotating the joint portion 28 as a fulcrum. Therefore, the package L loaded on the first mounting portion 30 is not inclined.

The form of the delivery rotary-wing aircraft 1 is a horizontal movement posture. Then, the delivery rotary-wing aircraft 1 horizontally moves the distance from the air above the departure place to the air over the destination while maintaining the horizontal movement posture. The horizontal movement posture is the flight mode adopted for the longest time while the delivery rotary-wing aircraft 1 is flying.

(E) Horizontal Movement Posture

In the delivery rotary-wing aircraft 1, by making the arm portion 16 inclined, the forward inclined posture is maintained in a state of being inclined downwardly with respect to the traveling direction, and the numbers of rotations of the rotary wings 12A to 12D on which the arm portion 16 is mounted can be equalized. The delivery rotary-wing aircraft 1 does not need to set the numbers of revolutions of the rotary wings 12B, 12C on the rear side in the traveling direction larger than the numbers of revolutions of the rotary wings 12A, 12D on the front side.

Since the arm portion 16 maintains the forward inclined posture in a state where the arm portion 16 descends frontward with respect to the traveling direction, it is possible to remarkably reduce an air resistance until the delivery rotary-wing aircraft 1 moves horizontally and reaches up to the air over the destination.

The delivery rotary-wing aircraft 1 of the present invention can make the numbers of rotations of the rotary wings 12A to 12D equal. That is, in the delivery rotary-wing aircraft 1, it is unnecessary to increase the numbers of rotations of the rear rotary wings 12B, 12C in the traveling direction to be greater than the numbers of rotations of the front rotary wings 12A, 12D.

Therefore, there is no need to raise the output of the power sections 14B, 14C of the rear rotary wings 12B, 12C. As a result, when the power sections 14A to 14D of the rotary wings 12A to 12D provided in the delivery rotary-wing aircraft 1 are motors, the motor load can be dispersed. For this reason, the possibility that a power section of a specific rotary wing will fail due to heat generation or the like is reduced. Further, in the delivery rotary-wing aircraft 1 can improve fuel economy by dispersing the motor load. By dispersing the motor load, a motor having low motor efficiency does not exist. In this way, the delivery rotary-wing aircraft 1 can reduce the burden on the battery, so that the reliability of the battery can be improved.

Further, when the delivery rotary-wing aircraft 1 moves horizontally, the second mounting portion 40 is the most distal end portion with respect to the traveling direction. The horizontal movement posture of the delivery rotary-wing aircraft 1 can be almost linear. It is possible to greatly reduce the air resistance when the delivery rotary-wing aircraft 1 moves horizontally.

That is, in the delivery rotary-wing aircraft 1, the first supporting member 24 and the second supporting member 26 are arranged on a straight line, and by inclining the arm portion 16 on which the rotor wing 12 is mounted, and maintaining the forward inclined posture as the rotary-wing aircraft, the projection area with respect to the traveling direction can be significantly reduced.

The flight posture of such delivery rotary-wing aircraft 1 contributes to improving the flight speed of the rotary-wing aircraft and improving the fuel economy of the rotary-wing aircraft.

In this way, the delivery rotary-wing aircraft 1 can improve the flight speed of the horizontal movement speed, and can expand the range of loadable package (payload). Furthermore, since the delivery rotary-wing aircraft 1 can make the numbers of rotations of the rotary wings 12A to 12D equal, it is possible to improve fuel economy.

(F) Rotation of the Supporting Member

FIG. 6 is a model diagram until the delivery rotary-wing aircraft 1 horizontally moves by adopting the horizontal movement posture, and arrives above the destination to complete the landing posture. In the delivery rotary-wing aircraft 1, the second supporting member 26 and the first supporting member 24 are rotated rightward at 90° so that the second mounting portion 40 is directed vertically upward with a joint portion 28 as a fulcrum. The joint portion 28 stops at the position where the second mounting portion 40 is rotated rightward at 90°, and then is fixed at this position by a lock mechanism or the like. In the delivery rotary-wing aircraft 1, the direction of the first mounting portion 30 is maintained vertically downward only by rotating the second supporting member 26 and the first supporting member 24 with the joint portion 28 as a fulcrum. Therefore, the package L loaded on the first mounting portion 30 is not inclined.

Further, in FIG. 6, the numbers of rotations of the rotary wings 12A to 12D after rotation of the supporting member of the delivery rotary-wing aircraft 1 is set to level (5).

(G) Horizontal of Arm Portion

In the delivery rotary-wing aircraft 1 in which the second mounting section 40 is vertically upward, the arm portion 16 is inclined forward in the traveling direction. As the arm portion 16 increases the numbers of revolutions of the rotary wings 12A and 12D which are lower frontward and decreases the number of revolutions of the rotary wings 12B and 12C which are higher rearward, thereby holding the arm portion 16 horizontally. As a result, the numbers of revolutions of the rotary wings are all equal. The delivery rotary-wing aircraft 1 takes a landing posture to a destination at an altitude H corresponding to the height of a high-rise building.

Further, in FIG. 6, when the arm portion 16 of the delivery rotary-wing aircraft 1 initiates a horizontal posture, the numbers of revolutions of the rotary wings 12A, 12D are set to level (6), and the rotation numbers of the rotary wings 12B and 12C are set to level (4).

FIG. 7 is a model diagram showing a state before extending the first supporting member 24 and a state after extending the first supporting member 24, after the delivery rotary-wing aircraft 1 takes a landing posture to the destination. In FIG. 7(a), the first supporting member 24 is provided with an adjustment means 242. A first supporting member existing between the adjustment means 242 and the joint portion 28 is 244, and the length thereof is l1. As described above, the first supporting member 24 is composed of a first supporting member 24b, which is an inner cylindrical part, with respect to the first supporting member 24a which is an outer cylindrical part. By operating the adjustment means 242, the first supporting member 24b accommodated in the first supporting member 24a is protruded downward and fixed.

Further, when the adjustment means 242 has a screw structure, the screw may be loosened. If the adjustment means 242 has a pin-fixing structure, the pin may be pulled out.

In FIG. 7(b), the first supporting member 24 has a first supporting member 244 existing between the adjustment means 242 and the joint portion 28, and its length is l2. When the adjustment means 242 is operated, the first supporting member 24b is protruded downward and fixed. As a result, the length of the first supporting member 24 is extended the length of the first supporting member 24b which is the inner cylinder.

FIG. 8 is a model diagram until the delivery rotary-wing aircraft 1 receives an updraft by high-rise buildings or the like, lands on the destination, unloads a package L, and completes the delivery of the package. The delivery rotary-wing aircraft 1 is affected by an updraft occurring in a high-rise building or the like. The delivery rotary-wing aircraft 1 receives an updraft blown upward from the lower side toward the upper side from the lower side of the rotary-wing aircraft. The updraft directly hits the bottom surface of the storage box 30a of the first mounting portion 30 constituting the delivery rotary-wing aircraft 1, and the rotary wing mounted on the arm portion 16. In FIG. 8, the destination may be a destination surface, or a courier heliport dedicated to the delivery rotary-wing aircraft 1 installed in a high-rise building.

When an upward force due to the updraft is applied to a general rotary-wing aircraft, the rotary-wing aircraft loses its balance and falls. However, the delivery rotary-wing aircraft 1 extends the first supporting member 24 vertically downward at the stage before an upward force due to an updraft is applied. The delivery rotary-wing aircraft 1 lowers the center of gravity of the rotary-wing aircraft. By lowering the center of gravity of the delivery rotary-wing aircraft 1, it is possible to cancel the upward force applied to the delivery rotary-wing aircraft 1 by the updraft.

The delivery rotary-wing aircraft 1 lowers its center of gravity in order to counteract the force generated by the updraft. The length of the first supporting member 24 required for lowering the center of gravity is determined in relation to the force generated by the updraft.

In addition, the delivery rotary-wing aircraft 1 may lower the numbers of rotations of the rotary wings 12A to 12D in order to counteract the updraft. By lowering the numbers of rotations of the rotary wings 12A to 12D, gravity due to its own weight of the delivery rotary-wing aircraft 1 is generated. Gravity due to its own weight of the delivery rotary-wing aircraft 1 can counteract the force generated by the updraft. Further, the delivery rotary-wing aircraft 1 may stop the rotation of the rotary wings 12A to 12D in order to counteract the force generated by the updraft. By stopping the rotation of the rotary wings 12A to 12D, gravity due to its own weight is generated in the delivery rotary-wing aircraft 1. Such a vertically downward force can counteract the force generated by the updraft.

Further, the delivery rotary-wing aircraft 1 may move the position of the arm portion 16 downward to counteract the force generated by the updraft. In order to move the position of the arm portion 16 in the downward direction, the connecting portion 22 is moved downward.

As described above, by appropriately combining means for lowering the center of gravity of the delivery rotary-wing aircraft 1, the delivery rotary-wing aircraft 1 of the present invention can counteract the force generated by the updraft occurring in high-rise buildings or the like.

A general rotary-wing aircraft maintains the balance of the rotary-wing aircraft by adjusting a gain set in the rotary-wing aircraft. If the gain of the rotary-wing aircraft is set high, it is possible to stably maintain the posture of the rotary-wing aircraft against the force applied to the rotary-wing aircraft. However, the rotary-wing aircraft is liable to cause hunting, resulting in a fall of the rotary-wing aircraft. On the other hand, if the gain of the rotary-wing aircraft is set low, the rotary-wing aircraft makes it difficult to generate hunting, but it is impossible to stably maintain the posture of the rotary-wing aircraft against the force applied to the rotary-wing aircraft. As a result, the rotary-wing aircraft loses its balance and fall.

Since a general rotary-wing aircraft has to set a gain according to the type of flight, the burden of the operator is great. However, in the delivery rotary-wing aircraft 1 of the present invention, the center of gravity is moved downward by extending the length of the first supporting member 21 supporting the first mounting portion 30 vertically downward, and thus, it is possible to easily cope with the force generated by the updraft. In other words, it is sufficient for the delivery rotary-wing aircraft 1 to adjust its gain only once, and thereafter, there is no need to adjust the gain again.

(Separation and Detachment of Packages)

The delivery rotary-wing aircraft 1 lands on the destination and drops off the package L loaded on the first mounting section 30 to the destination. The delivery rotary-wing aircraft 1 and the package L are separated. Separation of the delivery rotary-wing aircraft 1 and the package L is performed by detaching a storage case 30a loaded with the package L from the mounting portion 30b of the first mounting portion 30 and dropping off the baggage L to the destination.

Normally, immediately after the package L is separated from the delivery rotary-wing aircraft 1, it is considered that the payload becomes small, and the center of gravity of the rotary-wing aircraft 1 moves upward. However, after arriving above the destination, the delivery rotary-wing aircraft 1 extends the first supporting member 24 vertically downward at a stage before receiving the updraft, and the delivery rotary-wing aircraft 1 lowers the center of gravity of the rotary-wing aircraft downward. As the packages are separated from the delivery rotary-wing aircraft 1, movement of the center of gravity in the upward direction generated in the rotary-wing aircraft is canceled by the movement of the center of gravity in the downward direction of the rotary-wing aircraft. Thus, even after the packages are separated from the delivery rotary-wing aircraft 1, the center of gravity of the rotary-wing aircraft does not move.

After the storage case 30a is separated from the first mounting portion 30, the first mounting portion 30 is only the mounting portion 30b. Then, in a state in which the package L loaded on the first mounting portion 30 is unloaded, the delivery rotary-wing aircraft 1 departs from the destination and takes off. The delivery rotary-wing aircraft 1 moves to a departure place as a destination.

(Route B "from the Destination to the Departure Place")

Route B is a flight route when the delivery rotary-wing aircraft 1 that has separated (unloaded) the package L at the destination sets the departure place as a destination and returns to the departure place.

FIG. 9 is a model diagram showing a flight mode when the delivery rotary-wing aircraft 1, from which the package has been separated, moves from the destination to the departure place. The operator operates a control device to raise the output of the power sections 14A to 14D of the rotary wing portions 10A to 10D, thereby increasing the numbers of rotations of the rotary wings 12A to 12D. By the rotation of the rotary wings 12A to 12D, a lift necessary for lifting the delivery rotary-wing aircraft 1 is generated. When the lift exceeds the gravity by acting on the delivery rotary-wing aircraft 1, the delivery rotary-wing aircraft 1 leaves the ground and takes off the destination.

(A') Aerial Stopping (Hovering)

The delivery rotary wing aircraft 1 flies on the same route as the route A in the reverse direction and returns to the departure place. Basically, in route B, the flight mode of the delivery rotary-wing aircraft 1 is the same as that of the route A. In route B, since a load is not loaded on the first mounting portion 30, the center of gravity Cg of the delivery rotary-wing aircraft 1 is moving vertically upward. Therefore, in order for the delivery rotary-wing aircraft 1 to fly route B, an operator may set a new gain different from the gain used for route A.

In route B, the delivery rotary-wing aircraft 1 rises and reaches a certain altitude. In route B, an altitude different from that of route A may be set again. The delivery rotary-wing aircraft 1 that arrived at the altitude performs aerial stopping (hovering).

(B') Inclination of Arm Portion

In the arm portion 16 of the delivery rotary-wing aircraft 1 which is stopping in the air (hovering), the front rotary wing A is positioned lower than the rear rotary wing B so as to incline forwardly downward. Thereafter, the delivery rotary-wing aircraft 1 adjusts the numbers of rotations of the rotary wings 12A to 12D after inclining the arm portion 16 while hovering (aerial stopping).

(C')-(E') Adjustment of the Numbers of Rotations, Horizontal Movement Posture, Etc.

Next, in the delivery rotary-wing aircraft 1, the second supporting member 26 and the first supporting member 24 are rotated leftward at 90° so that the second mounting portion 40 is the most distal end portion with respect to the advancing direction, with the joint portion 28 as a starting point. The flight mode of the delivery rotary-wing aircraft 1 is the horizontal movement posture in route B. The delivery rotary-wing aircraft 1 horizontally moves the distance from the sky above the destination to the sky above the departure place while maintaining the horizontal movement posture.

In the delivery rotary-wing aircraft 1 of the present invention, by inclining the arm portion 16, the forward bent posture that is downwardly inclined with respect to the traveling direction is maintained, and the numbers of rotations of the rotary wings 12A to 12D on which the arm portion 16 is mounted can be equalized. When horizontally moving, the delivery rotary-wing aircraft 1 employs a structure in which the second mounting portion 40 is the most distal end portion with respect to the traveling direction, and the second supporting member 26 and the first supporting member 24 are linear. The delivery rotary-wing aircraft 1 can greatly reduce the air resistance when horizontally moving. Moreover, in route B, since the package L is not loaded on the first mounting portion 30, the total weight of the delivery rotary-wing aircraft 1 is reduced. Therefore, the horizontal moving speed of the delivery rotary-wing aircraft 1 can be further improved.

The delivery rotary-wing aircraft 1 moves horizontally and arrives above the departure place. In the departure place, in general, an updraft is not generated but if some force due to the updraft or the like is applied to the delivery rotary-wing aircraft 1, an operation of lowering the center of gravity as described for route A may be performed.

Thus, the delivery rotary-wing aircraft 1 of the present invention can, even when the arm portion 16 has a certain angle around the connection portion 22, make the rotational speeds of the rotary wings 12A to 12D equal, thereby improving the moving speed of the delivery rotary-wing aircraft. In addition, a large amount of package can be loaded by the first mounting portion 30 of the delivery rotary-wing aircraft 1, making it possible to cope with the payload.

Furthermore, even if the delivery rotary-wing aircraft 1 of the present invention receives an updraft by a high-rise building or the like, the rotary-wing aircraft itself does not incline and can stably land on the destination. Even after separating the package from the rotary-wing aircraft, the balance is not lost.

Second Embodiment

The delivery rotary-wing aircraft 1 of the second embodiment is of a type employing a ladder frame in the central portion 20 and the arm portion 16 which are the basic structure of the rotary-wing aircraft. The delivery rotary-wing aircraft 1 of the second embodiment has a basic structure of a ladder frame composed of four aluminum hollow square bars. A space can be formed at the center of the ladder frame. The space can be changed according to the use of the rotary-wing aircraft, and a large space can be formed. At the central portion of the ladder frame, a second mounting part can be provided. Various attachments can be installed in the second mounting part. In the delivery rotary-wing aircraft 1 of the second embodiment, an attachment can be installed at the central portion of the ladder frame according to its applications, it has an optimized frame shape, and thus, it can also be utilized as a multi-role rotary-wing aircraft.

Third Embodiment

In the third embodiment, a GPS antenna 42 for receiving a signal for positioning is mounted on the distal end portion 40 of the second mounting portion 40, and a joint portion 44 is provided so that the GPS antenna 42 is always vertically upward. The joint portion 44 is provided on a third supporting member constituting the GPS antenna 42. Since the delivery rotary-wing aircraft 1 can maintain the GPS antenna horizontally by a joint portion 44, so that it is possible to fly without lowering the reception sensitivity.

That is, the reception sensitivity of the GPS antenna can be matched between the ground surface and the sky. The delivery rotary-wing aircraft 1 of the third embodiment can also cope with multipath and jamming waves from the ground surface. Furthermore, the delivery rotary-wing aircraft 1 of the third embodiment can improve a positioning accuracy by adopting a choke ring antenna.

The delivery rotary-wing aircraft 1 of the third embodiment has a good reception sensitivity of the GPS antenna even in areas where many high-rise buildings are located and areas where radio wave disturbances occur frequently.

The delivery rotary-wing aircraft 1 of the third embodiment may be provided with a parachute in the lower portion of the second mounting portion 40. Even when the delivery rotary-wing aircraft 1 cannot predict it, when the aircraft becomes uncontrollable by the operator, and when the battery runs short during flight, the rotary-wing aircraft will not fall. The delivery rotary-wing aircraft 1 can safely deliver the load loaded on the first mounting portion 30 to the destination or the ground by opening the loaded parachute. The parachute is launched by operating the launcher mounted on the second mounting portion 40.

Although the embodiments of the present invention have been described above, the present invention is not limited to the above-described embodiments, and all modifications of conditions and the like that do not depart from the gist are all within the scope of the present invention.

INDUSTRIAL APPLICABILITY

The delivery rotary-wing aircraft of the present invention can cope with the updraft occurring in a high-rise building or the like. Therefore, the delivery rotary-wing aircraft of the present invention can expect the use as a delivery rotary-wing aircraft dedicated for package delivery service, with tall buildings such as high-rise buildings as landing grounds, and the use as a rotary-wing aircraft dedicated for industrial package delivery in a warehouse or a factory. Further, the delivery rotary-wing aircraft of the present invention can be used in aircraft related industries such as multicopters or drones, and further the present invention can be preferably used not only as a rotary-wing aircraft for aerial photographing mounted with a camera or the like, but also it can be used for various industries such as security field, agriculture, infrastructure monitoring and others.

EXPLANATION OF SIGN 1 delivery rotary-wing aircraft
10A to 10D rotary wing portion
12A to 12D rotary wing
14A to 14D power section
16A to 16D arm portion
20 central portion
22 connection portion (ball joint)
22a socket
24 first supporting member (first mounting portion to connection portion)
26 second supporting member (central portion to second mounting portion)
242 adjustment mechanism
244 first supporting member (adjustment mechanism—joint portion)
26 second supporting member (central portion to second mounting portion)
28 joint portion
30 first mounting part
L package (for delivery service)
30a storage box
30b mounting portion
40 second mounting part
42 GPS antenna

The invention claimed is:
1. A delivery rotary-wing aircraft comprising:
a plurality of rotary wings;
a central portion to which a plurality of arm portions for supporting the rotary wings are connected;
a mounting portion for loading an object;
a supporting member for connecting the mounting portion with the central portion; and
a connection portion equipped at between the central portion and the supporting member,
wherein the plurality of arm portions are provided to extend from the central potion,
wherein a center of lift occurring in the rotary-wing aircraft with rotations of the plurality of rotary wings and a center of gravity of the rotary-wing aircraft coincide with a center of the connection portion, and, wherein the supporting member is configured to extend downward.

2. The delivery rotary-wing aircraft according to claim 1, wherein the supporting member has a joint portion between the connection portion and the mounting portion.

3. The delivery rotary-wing aircraft according to claim 2, wherein, when the rotary-wing aircraft moves in a horizontal direction, the rotary-wing aircraft rotates the supporting member around the joint portion so that a posture of the mounting portion keeps horizontal.

4. The delivery rotary-wing aircraft according to claim 1, wherein the center of the connection portion is positioned on a plane formed by the plurality of rotary wings.

* * * * *